United States Patent
Park et al.

(10) Patent No.: US 10,521,057 B2
(45) Date of Patent: Dec. 31, 2019

(54) TOUCH SCREEN PANEL HAVING OVERLAPPING SENSING ELECTRODES AND METHOD OF MANUFACTURING THE SAME

(71) Applicant: SAMSUNG DISPLAY CO., LTD., Yongin-si, Gyeonggi-Do (KR)

(72) Inventors: Sung-Kyun Park, Yongin-si (KR); Kyung-Seop Kim, Yongin-si (KR); Jae-Neung Kim, Yongin-si (KR); Cheol-Kyu Kim, Yongin-si (KR); Ki-Hyun Cho, Yongin-si (KR); Sun-Haeng Cho, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 104 days.

(21) Appl. No.: 14/852,641

(22) Filed: Sep. 14, 2015

(65) Prior Publication Data
US 2016/0139705 A1 May 19, 2016

(30) Foreign Application Priority Data
Nov. 13, 2014 (KR) .................. 10-2014-0158259

(51) Int. Cl.
*G06F 3/044* (2006.01)
(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC ............. G06F 1/16; G06F 3/041; G06F 3/044
See application file for complete search history.

(56) References Cited

U.S. PATENT DOCUMENTS

| | | | |
|---|---|---|---|
| 2010/0007626 A1* | 1/2010 | Lai | G06F 3/0412 345/174 |
| 2010/0212974 A1 | 8/2010 | Kim | |
| 2012/0234663 A1 | 9/2012 | Hwang et al. | |

(Continued)

FOREIGN PATENT DOCUMENTS

| KR | 10-2010-0095126 A | 8/2010 |
|---|---|---|
| KR | 10-2012-0092004 A | 8/2012 |

(Continued)

*Primary Examiner* — William Boddie
*Assistant Examiner* — Andrew B Schnirel
(74) *Attorney, Agent, or Firm* — Kile Park Reed & Houtteman PLLC

(57) ABSTRACT

A method of forming a touch screen panel including first sensing electrodes in an active region of a substrate and arranged along a first direction and second sensing electrodes arranged along a second direction intersecting the first direction, the method including forming the first sensing electrodes and first connection patterns, the first connection patterns connecting the first sensing electrodes along the first direction; forming an insulating pattern capping the first sensing electrodes and the first connection patterns so that the first sensing electrodes and the first connection patterns are not exposed; and forming the second sensing electrodes between the first sensing electrodes, and second connection patterns on the insulating pattern, the second connection patterns connecting the second sensing electrodes along the second direction.

17 Claims, 6 Drawing Sheets

(56) References Cited

U.S. PATENT DOCUMENTS

| | | | |
|---|---|---|---|
| 2013/0278513 A1 | 10/2013 | Jang | |
| 2014/0069796 A1 | 3/2014 | Kang et al. | |
| 2015/0060125 A1* | 3/2015 | Stevenson | G06F 3/044 174/261 |
| 2015/0107978 A1* | 4/2015 | Han | G06F 3/044 200/5 R |
| 2015/0253882 A1* | 9/2015 | Lee | G06F 3/041 345/173 |
| 2015/0373839 A1* | 12/2015 | Kim | H05K 1/0274 345/174 |

FOREIGN PATENT DOCUMENTS

| | | |
|---|---|---|
| KR | 10-2013-0118072 A | 10/2013 |
| KR | 10-2014-0033966 A | 3/2014 |

\* cited by examiner

TOUCH SCREEN PANEL HAVING OVERLAPPING SENSING ELECTRODES AND METHOD OF MANUFACTURING THE SAME

CROSS-REFERENCE TO RELATED APPLICATION

Korean Patent Application No. 10-2014-0158259, filed on Nov. 13, 2014, in the Korean Intellectual Property Office, and entitled: "Touch Screen Panel and Method Of Manufacturing The Same," is incorporated by reference herein in its entirety.

BACKGROUND

1. Field

Provided is a touch screen panel and a method of manufacturing the same.

2. Description of the Related Art

A touch screen panel may be an input device configured to input a user's command by selecting executable content shown on a screen of an image display device using a human finger or an object. A touch screen panel may substitute for additional operating input devices, such as a keyboard and a mouse, which may be connected to an image display device.

SUMMARY

Embodiments may be realized by providing a method of forming a touch screen panel including first sensing electrodes in an active region of a substrate and arranged along a first direction and second sensing electrodes arranged along a second direction intersecting the first direction, the method including forming the first sensing electrodes and first connection patterns, the first connection patterns connecting the first sensing electrodes along the first direction; forming an insulating pattern capping the first sensing electrodes and the first connection patterns so that the first sensing electrodes and the first connection patterns are not exposed; and forming the second sensing electrodes between the first sensing electrodes, and second connection patterns on the insulating pattern, the second connection patterns connecting the second sensing electrodes along the second direction.

Forming the first sensing electrodes and the first connection patterns may include forming a first conductive layer on the substrate; and patterning the first conductive layer and forming the first sensing electrodes and the first connection patterns.

The method may further include forming first outer wirings in a non-active region around the active region of the substrate and connected to the first sensing electrodes as lines.

Forming the first outer wirings may include patterning the first conductive layer and simultaneously forming the first sensing electrodes, the first connection patterns, and the first outer wirings.

The first sensing electrode, the first connection patterns, and the first outer wirings may be on the same layer.

Forming the insulating pattern may include forming an insulating layer on the substrate on which the first sensing electrodes and the first connection patterns are formed; and patterning the insulating layer and forming the insulating pattern.

Forming the second sensing electrodes and the second connection patterns may include forming a second conductive layer on the substrate on which the insulating pattern is formed; and patterning the second conductive layer and forming the second sensing electrodes and the second connection patterns.

The method may further include forming second outer wirings in a non-active region around the active region of the substrate and connected to the second sensing electrodes as lines.

Forming the second outer wirings may include patterning the second conductive layer and simultaneously forming the second sensing electrodes, the second connection patterns, and the second outer wirings.

The second sensing electrodes and the second outer wirings may be on the same layer.

The insulating pattern and the second sensing electrodes may not overlap.

The second sensing electrodes may overlap a part of an edge of the insulating pattern.

The second connection patterns may cross in the second direction on the insulating pattern overlapping the first connection patterns.

The first sensing electrodes and the second sensing electrodes may have metal mesh patterns.

Forming the first sensing electrodes and the first connection patterns may include forming a first electrode conductive layer on the substrate; forming a wiring conductive layer on the first electrode conductive layer; and patterning the first electrode conductive layer and the wiring conductive layer, and forming the first sensing electrodes and the first connection patterns.

Forming the first sensing electrodes and the first connection patterns may include patterning the first electrode conductive layer and the wiring conductive layer, and forming first outer wirings in a non-active region around the active region of the substrate and connected to the first sensing electrodes as lines, and second outer wirings in a non-active region around the active region of the substrate and connected to the second sensing electrodes as lines.

Forming the first sensing electrodes and the first connection patterns may further include removing the wiring conductive layer on the first sensing electrodes and the first connection patterns.

Forming the second sensing electrodes and the second connection patterns may include forming a second electrode conductive layer on the substrate on which the insulating pattern is formed; and patterning the second electrode conductive layer and forming the second sensing electrodes and the second connection patterns.

The first sensing electrodes and the second sensing electrodes may include a material including silver nanowire (AgNW).

Embodiments may be realized by providing touch screen panel, including a substrate divided into an active region and a non-active region around the active region; first sensing electrodes in the active region and arranged along a first direction, and first connection patterns connecting the first sensing electrodes along the first direction; an insulating pattern capping the first sensing electrodes and the first connection patterns so that the first sensing electrodes and the first connection patterns are not exposed; and second sensing electrodes between the first sensing electrodes and arranged along a second direction intersecting the first direction, and second connection patterns on the insulating pattern, the second connection patterns connecting the second sensing electrodes in the second direction.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
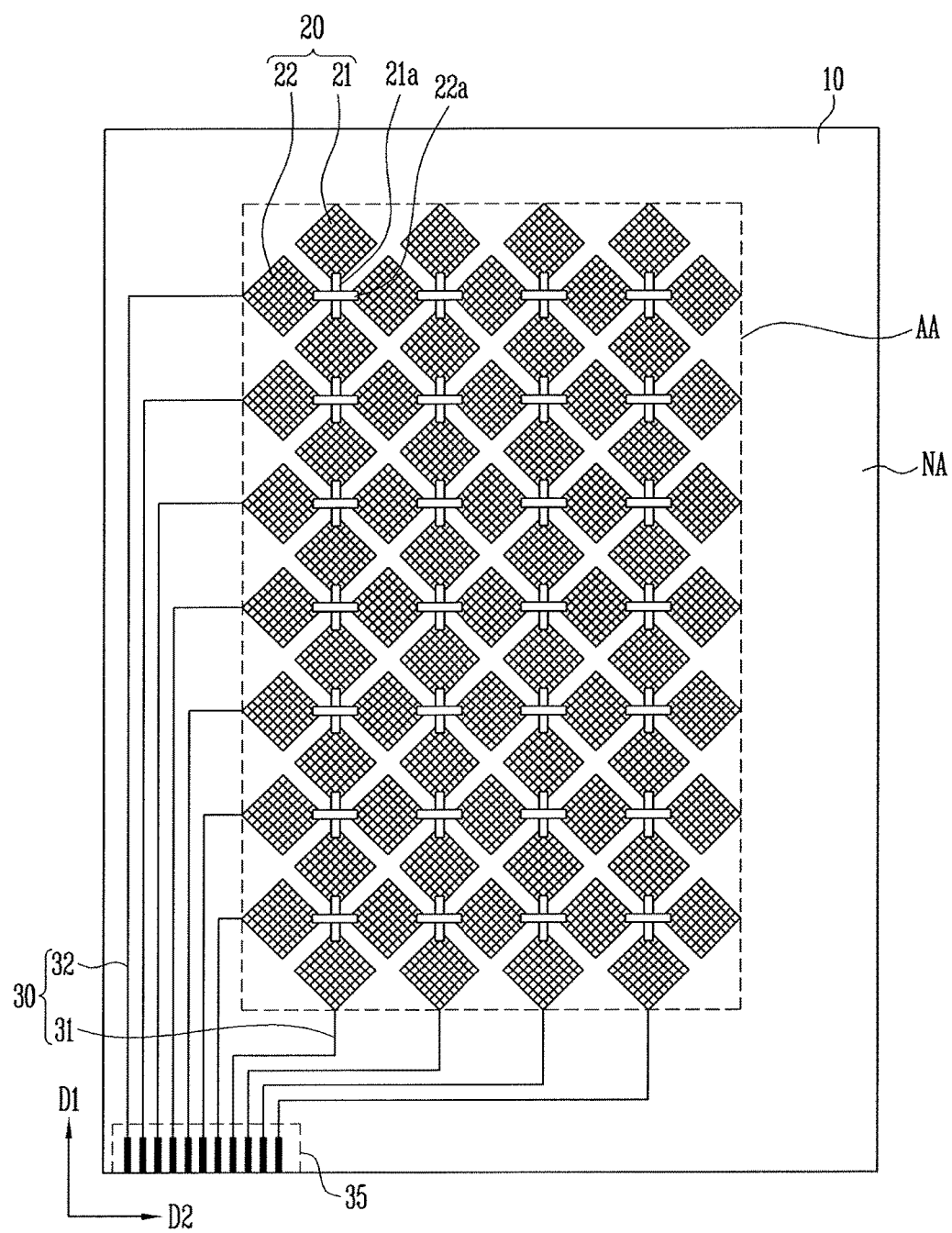
FIG. 1 illustrates a schematic plan view of a touch screen panel according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic plan view of a touch screen panel according to an embodiment. Referring to FIG. 1, a touch screen panel may include a substrate 10, sensing electrodes 20, and outer wirings 30.

The substrate 10 may be formed of a transparent material having characteristics including a high heat resistance and a chemical resistance, and the substrate 10 may have a property of flexibility in some embodiment. For example, the substrate 10 may be a thin layer type film substrate formed of one or more materials selected from a group consisting of polyethylene terephthalate (PET), polycarbonate (PC), an acryl, polymethyl methacrylate (PMMA), triacetyl cellulose (TAC), polyether sulfone (PES), and a polyimide (PI).

The substrate 10 may be divided into an active region AA in which touch input is detected and a non-active region NA in which the touch input is not detected and is located around the active region AA. In the case of a touch screen panel integrated with a display, the active region AA may overlap an image display region of a display unit coupled with a touch screen panel and may become visible to the outside, and the non-active region NA may overlap a non-display region and may become invisible to the outside due to a frame covering the non-display region or a light shielding layer blocking light.

The sensing electrodes 20 may be distributed on the active region AA of the substrate 10 and include a plurality of first sensing electrodes 21 formed to be electrically connected along a first direction D1, and a plurality of second sensing electrodes 22 distributed between the first sensing electrodes 21 to avoid an overlap with the first sensing electrodes 21 and formed to be electrically connected along a second direction D2 intersecting the first direction D1.

In an embodiment, the first sensing electrodes 21 and the second sensing electrodes 22 may be alternately disposed and connected along different directions. For example, the first sensing electrodes 21 may be formed to connect along a row direction (i.e., a horizontal direction) and connected to each of outer wirings 30 in units of, e.g., as, row lines, and the second sensing electrodes 22 may be formed to connect along a column direction (i.e., a vertical direction) and connected to each of outer wirings 30 in units of, e.g., as, column lines.

The above-described sensing electrodes 20 may be formed of a transparent electrode material such as indium tin oxide (ITO) or formed of a low resistance metal having a metal mesh structure to transmit a light from a display unit disposed on a lower portion of the touch screen panel. The sensing electrodes 20 may be a material that includes a silver nanowire (AgNW), which may have an improved electrical characteristic and flexibility characteristic. In an embodiment, various examples may be applied in consideration of a shape, a material quality, and a structure of the sensing electrodes 20. The sensing electrodes 20 may be formed of a metal, and an effect of preventing the sensing electrodes 20 from being damaged during an etching process may be maximized.

First connection patterns 21a may be connected to the first sensing electrodes 21 along the first direction D1, and second connection patterns 22a may be connected to the second sensing electrodes 22 along the second direction D2. The first and second connection patterns 21a and 22a each may be the same material as each of the sensing electrodes 20 and may be formed to have a pattern directly connecting each of the sensing electrodes 20. Insulating patterns (not shown) may be located between the first connection patterns 21a and the second connection patterns 22a, and insulating properties thereof may be ensured.

In an embodiment, although the first and second connection patterns 21a and 22a are illustrated to have been formed of the same metal as the sensing electrodes 20, the first and second connection patterns 21a and 22a may be formed of a nonmetal transparent electrode material such as ITO in another embodiment. The first and second connection patterns 21a and 22b may be formed of the same metal as the sensing electrodes 20, and a process may be simplified through integration of the patterning during an operation of a metal patterning. For example, the first sensing electrodes 21 and the first connection patterns 21a may be integrally patterned, and the second sensing electrodes 22 and the second connection patterns 22a may be integrally patterned. Widths, thicknesses, or lengths of the first and second connection patterns 21a and 22a may be adjusted to prevent visibility thereof.

The outer wirings 30 may serve to connect the first sensing electrodes 21 and the second sensing electrodes 22 in units of, e.g., as, lines along the first direction D1 and the second direction D2, respectively, to an external driving circuit. For example, the outer wirings 30 may be electrically connected to the first and second sensing electrodes 21 and 22 in units of, e.g., as, row lines and units of, e.g., as, column lines and configured to connect the first and second sensing electrodes 21 and 22 to the external driving circuit such as a position sensing circuit through a pad unit 35. The outer wirings 30 may include first outer wirings 31 connected to the first sensing electrodes 21 in units of, e.g., as, column lines and second outer wirings 32 connected to the second sensing electrodes 22 in units of, e.g., as, row lines.

The outer wirings 30 may be configured to avoid the active region AA and may be disposed in an area of the non-active region NA included in the touch screen panel. The outer wirings 30 may be selected from a wide range of materials other than a transparent electrode material and may be formed of a low resistance metal such as, for example, molybdenum (Mo), silver (Ag), titanium (Ti), copper (Cu), aluminum (Al), or molybdenum/aluminum/molybdenum (Mo/Al/Mo).

The above-described touch screen panel may be a touch screen panel using the capacitive method. When a touching object, such as a human finger or a stylus pen touches the touch screen panel, a change in capacitive with respect to a contact position may be transmitted from the sensing electrodes 20 to the driving circuit via the outer wirings 30 and the pad unit 35. Next, the contact position may be determined by an electrical signal generated from X and Y input process circuits (not shown), which may convert the change in the capacitance into the electrical signal.

Figure 2A:
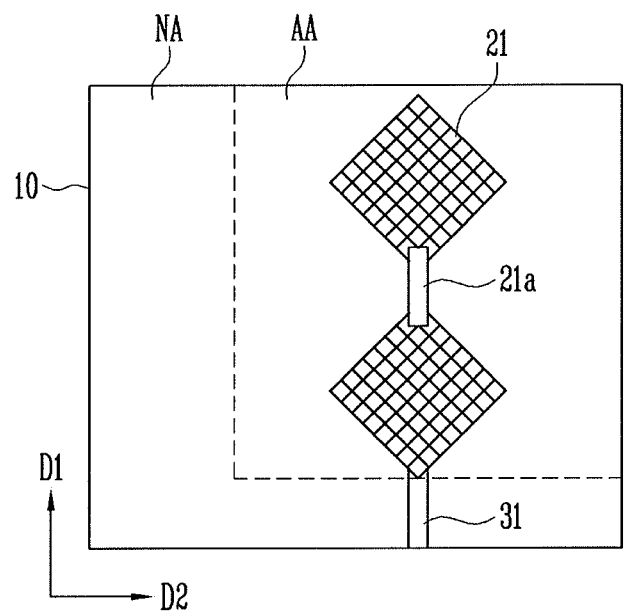
FIGS. 2A, 2B, and 2C illustrate partially enlarged views for describing a method of manufacturing the touch screen panel in FIG. 1.
Figure 2B:
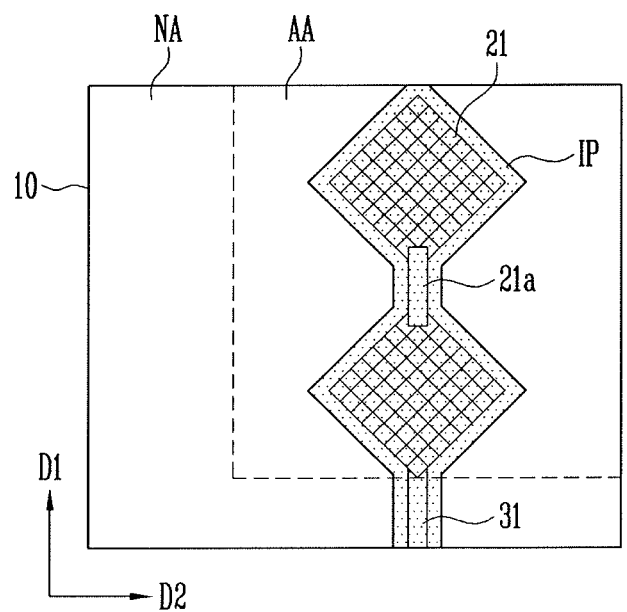
Figure 2C:
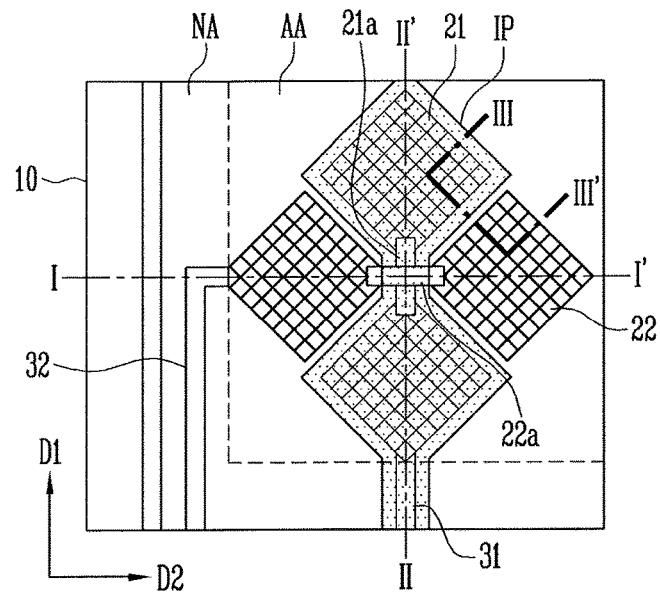

FIGS. 2A, 2B, and 2C illustrate partially enlarged views for describing a method of manufacturing the touch screen panel in FIG. 1, and FIGS. 3A, 3B, 3C, 3D, 3E, and 3F illustrate cross-sectional views for describing a method of manufacturing the touch screen panel in FIG. 1. FIGS. 4A and 4B illustrate partial cross-sectional views of a touch screen panel according to embodiments.

Each of FIGS. 3A to 3F illustrates a cross-sectional view taken along line I-I' together with a cross-sectional view taken along line II-II' of FIG. 2C, and FIGS. 4A and 4B illustrate cross-sectional views taken along line III-III' of FIG. 2C.

Figure 3A:
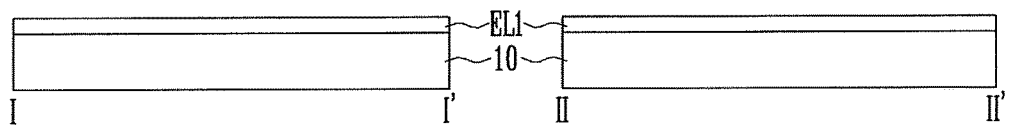
FIGS. 3A, 3B, 3C, 3D, 3E, and 3F illustrate cross-sectional views for describing the method of manufacturing the touch screen panel in FIG. 1.
Figure 3B:
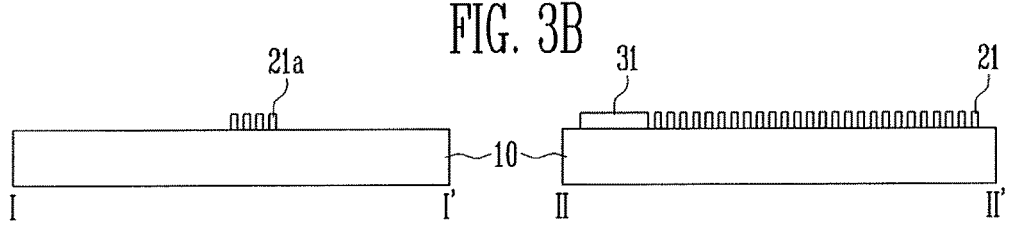
Figure 4A:
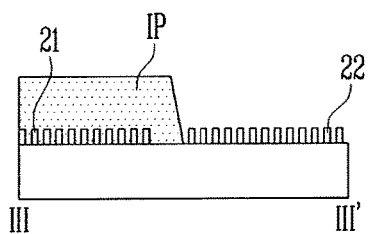
FIGS. 4A and 4B illustrate partial cross-sectional views of a touch screen panel according to embodiments.
Figure 4B:
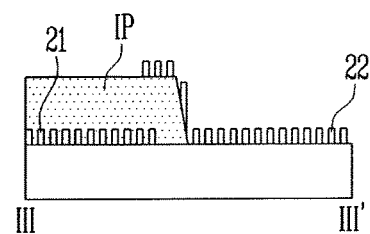

First, referring to FIGS. 2A, 3A, and 3B, a first conductive layer EL1 including a metal may be formed on the substrate 10, and the first sensing electrodes 21 and the first connection patterns 21a may be formed by patterning the first conductive layer EL1. For example, a photolithography process and an etching process using a mask (not shown), in which a mesh pattern corresponding to the first sensing electrodes 21 and the first connection patterns 21a is formed, may be performed with respect to the first conductive layer EL1.

The first sensing electrodes 21, the first connection patterns 21a, and the first outer wirings 31 may be the same material, and patterning the first conductive layer EL1 may form the first sensing electrodes 21 and the first connection patterns 21a in the active region AA and the first outer wirings 31 in the non-active region NA simultaneously. The first sensing electrodes 21, the first connection patterns 21a, and the first outer wirings 31 may be located on the same layer.

Figure 3C:
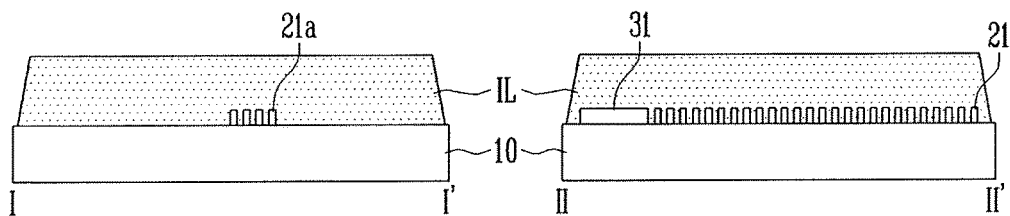
Figure 3D:
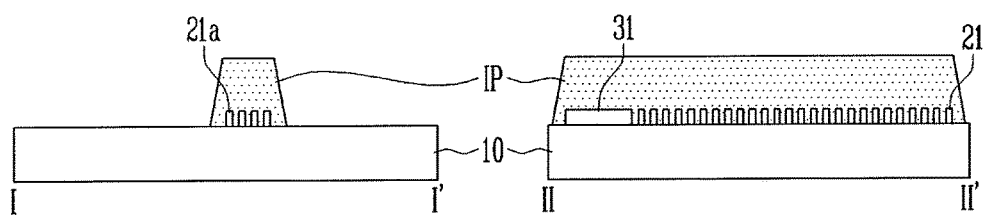

Next, referring to FIGS. 2B, 3C, and 3D, an insulating layer IL including an organic or inorganic insulating material may be formed on the substrate 10 on which the first sensing electrodes 21 and the first connection patterns 21a are formed, and an insulating pattern IP may be formed by patterning the insulating layer IL. For example, a photolithography process and an etching process using a mask (not shown), in which a pattern corresponding to the insulating pattern IP is formed, may be performed with respect to the insulating layer IL.

The insulating pattern IP may provide caps of the first sensing electrodes 21 and the first connection patterns 21a, and the first sensing electrodes 21 and the first connection patterns 21a may be prevented from being exposed. The insulating pattern IP may overlap the first sensing electrodes 21 and the first connection patterns 21a and may have a similar same shape and a slightly larger size than the first sensing electrodes 21 and the first connection patterns 21a, and the first sensing electrodes 21 and the first connection patterns 21a may be completely covered. The insulating pattern IP in a region excluding an area of the first sensing electrodes 21 and the first connection patterns 21a may be removed.

Figure 3E:
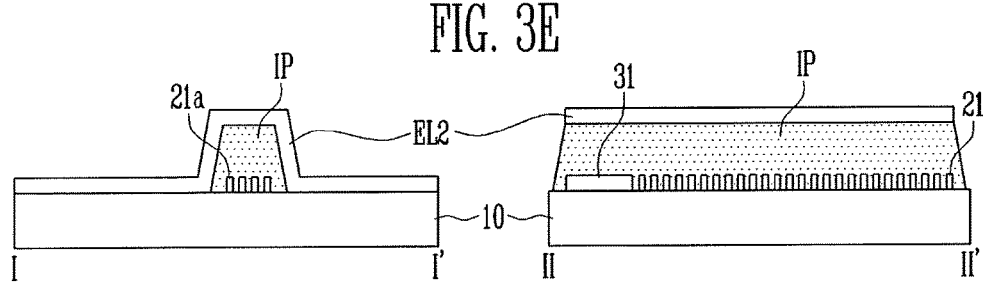
Figure 3F:
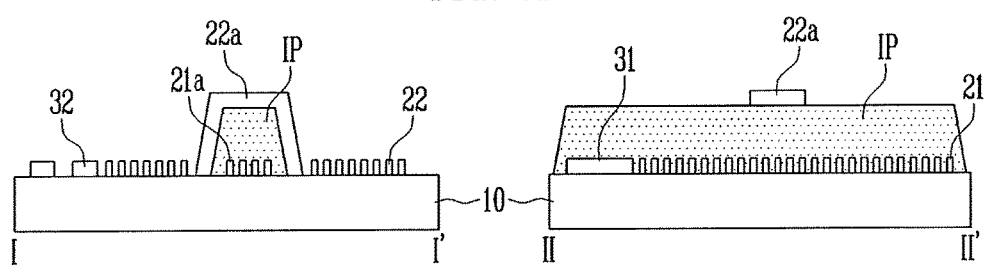

Next, referring to FIGS. 2C, 3E, and 3F, a second conductive layer EL2 having the same metal as the first conductive layer EL1 may be formed on the substrate 10 on which the insulating pattern IP is formed, and the second sensing electrodes 22 and the second connection patterns 22a may be formed by patterning the second conductive layer EL2. For example, a photolithography process and an etching process using a mask (not shown), in which a mesh pattern corresponding to the second sensing electrodes 22 and the second connection patterns 22a is formed, may be performed on the second conductive layer EL2.

The second sensing electrodes 22 may be located in a region where the insulating pattern IP formed by the above-described operation is not formed, and the second connection patterns 22a may be formed to cross in the second direction D2 intersecting the first connection patterns 21a on the insulating pattern IP, which may overlap the first connection patterns 21a. The first sensing electrodes 21 and the first connection patterns 21a may be protected by an overlaid insulating pattern IP, and the first sensing electrodes 21 and the first connection patterns 21a may not be damaged by a process of patterning the second sensing electrodes 22 and the second connection patterns 22a having the same metal material.

The second sensing electrodes 22, the second connection patterns 22a, and the second outer wirings 32 may be formed of the same material, and the second sensing electrodes 22 and the second connection patterns 22a may be formed in the active region AA and the second outer wirings 32 may be simultaneously formed in the non-active region NA by patterning the second conductive layer EL2. The second sensing electrodes 22 and the second outer wirings 32 may be located on the same layer.

Referring to FIGS. 4A and 4B, in an embodiment, the insulating pattern IP and the second sensing electrodes 22 may be formed not to overlap each other, and in another embodiment, the second sensing electrodes 22 may be formed to overlap a part of an edge of the insulating pattern IP. The first sensing electrodes 21 may be protected by an overlaid insulating pattern IP, and there may be no interference during a forming process even if there is no space between the first sensing electrodes 21 and the second sensing electrodes 22 or a partial overlap. A decrease in a dead space between the sensing electrodes 20 and an increase in a size of the sensing electrodes 20 may provide an advantageous benefit of space utilization.

Figure 5:
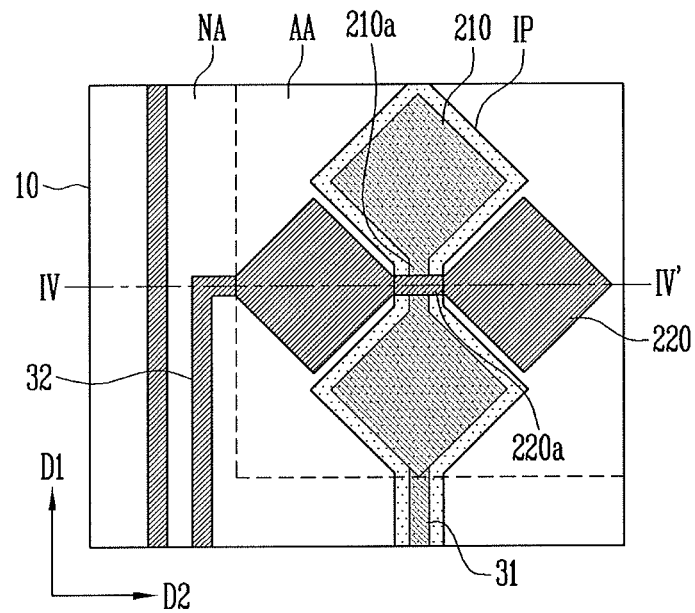
FIG. 5 illustrates an enlarged view of a part of a touch screen panel according to another embodiment.

FIG. 5 illustrates an enlarged view of a part of a touch screen panel according to another embodiment, and FIGS. 6A, 6B, 6C, 6D, 6E, 6F, and 6G illustrate cross-sectional views for describing a method of manufacturing the touch screen panel in FIG. 5.

FIGS. 6A to 6G illustrate cross-sectional views taken along line IV-IV' of FIG. 5. Regarding elements having the same reference numbers as the above-described elements, the elements may be referred to in the above-described disclosures unless there is no contradiction, and duplicated descriptions are intended to be omitted.

Figure 6A:
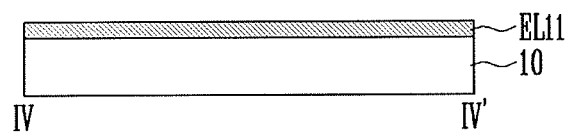
FIGS. 6A, 6B, 6C, 6D, 6E, 6F, and 6G illustrate cross-sectional views for describing a method of manufacturing the touch screen panel in FIG. 5.
Figure 6B:
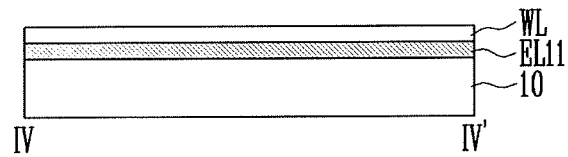

First, referring to FIGS. 6A and 6B, a first electrode conductive layer EL11 including silver nanowire (AgNW) or ITO material may be formed on a substrate 10, and a wiring conductive layer WL having a metal may be formed on the first electrode conductive layer EL11. In an embodiment, sensing electrodes 210 and 220 and outer wirings 31 and 32 may be formed of different materials, and the sensing electrodes 210 and 220 may have diamond shapes instead of having mesh patterns.

Figure 6C:
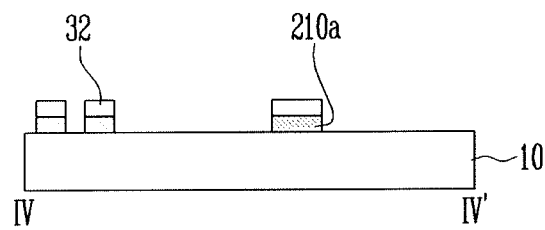
Figure 6D:
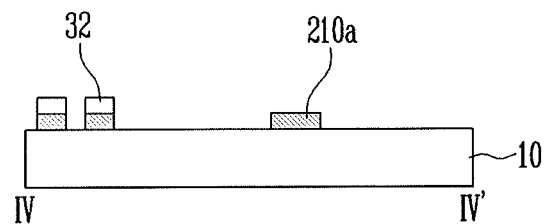

Next, referring to FIGS. 6C and 6D, the first sensing electrodes 210 and first connection patterns 210a may be formed in an active region AA, and the first outer wirings 31 and the second outer wirings 32 may be formed simultaneously in a non-active region NA by patterning the first electrode conductive layer EL11 and the wiring conductive layer WL. Only the first sensing electrodes 210 and a wiring conductive layer WL on the first connection patterns 210a may be selectively removed through an additional strip process.

Figure 6E:
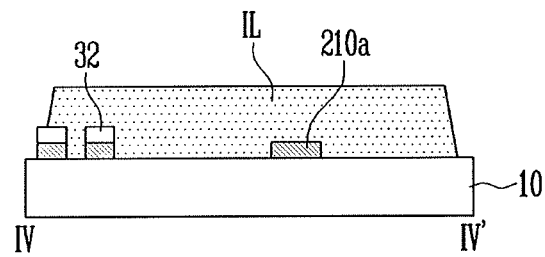
Figure 6F:
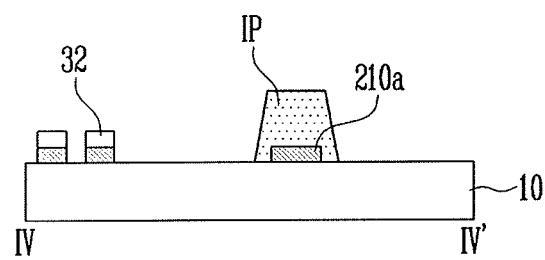

Next, referring to FIGS. 6E and 6F, an insulating layer IL having an organic or inorganic insulating material may be formed on the substrate 10 on which the first sensing electrodes 210 and the first connection patterns 210a are formed, and an insulating pattern IP may be formed by patterning the insulating layer IL. The insulating pattern IP may cover the first sensing electrodes 210 and the first connection patterns 210a, and the first sensing electrodes 210 and the first connection patterns 210a may be prevented from being exposed. The insulating pattern IP may overlap the first sensing electrodes 210 and the first connection patterns 210a and may have a similar shape and a slightly larger size than the first sensing electrodes 210 and the first connection patterns 210a, and the first sensing electrodes 210 and the first connection patterns 210a may be completely covered. The insulating pattern IP in a region excluding the first sensing electrodes 210 and the first connection patterns 210a may be removed.

Figure 6G:
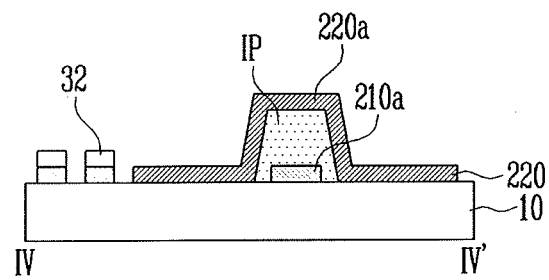

Next, referring to FIGS. 5 and 6G, a second electrode conductive layer (not shown) formed of the same material as the first electrode conductive layer EL11 may be formed on the substrate 10 on which the insulating pattern IP is formed, and the second sensing electrodes 220 and the second connection patterns 220a may be formed by patterning the second electrode conductive layer. The first sensing electrodes 210 and the first connection patterns 210a may be protected by an overlaid insulating pattern IP and may not be damaged by a process of patterning the second sensing electrodes 220 and the second connection patterns 220a having the same metal. The second outer wirings 32 connected to the second sensing electrodes 220 may be formed simultaneously during a forming operation of the above-described first outer wirings 31, and the second outer wirings 32 may not be formed in this operation.

By way of summation and review, a usage range of a touch screen panel may be extended. A resistive film method, a light detection method, and a capacitive method may provide a touch screen panel. A touch screen panel of a capacitive method may include sensing electrodes arranged in a touching active region, and may calculate a touching position, for example, of a human finger or an object, by detecting a change in capacitance formed at the sensing electrodes.

The sensing electrodes may be formed of a transparent electrode material such as indium tin oxide (ITO), and the sensing electrodes may be formed with a silver nanowire (AgNW) or a metal mesh pattern to reduce a thickness of the touch screen panel and to improve a flexible characteristic. A bridge pattern electrically connecting the sensing electrodes may also be formed of a metal.

When the sensing electrodes and the bridge pattern are formed of the above-described metallic materials, the sensing electrodes located on a lower portion of the bridge pattern may be damaged during an etching of the bridge pattern and may cause a problem. For example, when patterning outer wirings and bridge patterns formed of a metal material after the sensing electrodes are formed of a silver nanowire material, a silver nanowire material of the sensing electrodes may react to an etching solution used to pattern the bridge pattern, and may result in an increase of a surface resistance or a loss of a conductive characteristic.

According to embodiments disclosed herein, second sensing electrodes and second connection patterns may be formed while capping and protecting first sensing electrodes and first connection patterns with an insulating pattern, and a touch screen panel may be stably and easily manufactured while preventing sensing electrodes from being damaged during an etching operation.

Separating first and second sensing electrodes by a certain interval to prevent mutual interference may not be required, and there may be an advantageous benefit of space utilization. A resistance value may be lowered by forming a connection pattern having reduced length, and visibility may be improved by reducing a width of the connection pattern.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of forming a touch screen panel including first sensing electrodes in an active region of a substrate and arranged along a first direction and second sensing electrodes arranged along a second direction intersecting the first direction, the method comprising:
    forming the first sensing electrodes and first connection patterns simultaneously, the first connection patterns directly connecting the first sensing electrodes along the first direction;
    forming first outer wirings in a non-active region around the active region of the substrate and connected to the first sensing electrodes;
    forming an insulating pattern capping the first sensing electrodes, the first connection patterns and the first outer wirings; and
    forming the second sensing electrodes and second connection patterns simultaneously, the second connection patterns directly connecting the second sensing electrodes along the second direction, wherein:

the first and second sensing electrodes are formed on a same layer, each of the first sensing electrodes includes a first side extending from a corresponding first connection pattern of each of the first sensing electrodes in a third direction different from the first and second directions, each of the second sensing electrode includes a second side extending from a corresponding second connection pattern of each of the second sensing electrodes in the third direction, the insulating pattern includes a third side extending in the third direction, the first side of each of the first sensing electrodes, the second side of each of the second sensing electrodes, and the third side of the insulating pattern are adjacent to each other, the second connection patterns are formed on the insulating pattern, each of the first and second sensing electrodes has a mesh pattern including a plurality of lines crossing each other, and at least one of the plurality of lines of the second side of each of the second sensing electrodes is formed on at least a part of a lateral surface of the third side of the insulating pattern.

2. The method as claimed in claim 1, wherein forming the first sensing electrodes and the first connection patterns includes:

forming a first conductive layer on the substrate; and patterning the first conductive layer and forming the first sensing electrodes, the first connection patterns and the first outer wirings.

3. The method as claimed in claim 2, wherein forming the first outer wirings includes patterning the first conductive layer and simultaneously forming the first sensing electrodes, the first connection patterns, and the first outer wirings.

4. The method as claimed in claim 2, wherein the first sensing electrodes, the first connection patterns, and the first outer wirings are on a same layer.

5. The method as claimed in claim 1, wherein forming the insulating pattern includes:

forming an insulating layer on the substrate on which the first sensing electrodes and the first connection patterns are formed; and patterning the insulating layer and forming the insulating pattern.

6. The method as claimed in claim 1, wherein forming the second sensing electrodes and the second connection patterns includes:

forming a second conductive layer on the substrate on which the insulating pattern is formed; and patterning the second conductive layer and forming the second sensing electrodes and the second connection patterns.

7. The method as claimed in claim 6, further comprising forming second outer wirings in the non-active region around the active region of the substrate and connected to the second sensing electrodes.

8. The method as claimed in claim 7, wherein forming the second outer wirings includes patterning the second conductive layer and simultaneously forming the second sensing electrodes, the second connection patterns, and the second outer wirings.

9. The method as claimed in claim 7, wherein the second sensing electrodes and the second outer wirings are on a same layer.

10. The method as claimed in claim 1, wherein the second connection patterns cross in the second direction on the insulating pattern overlapping the first connection patterns.

11. The method as claimed in claim 1, wherein the first sensing electrodes and the second sensing electrodes have metal mesh patterns.

12. The method as claimed in claim 1, wherein forming the first sensing electrodes and the first connection patterns includes:

forming a first electrode conductive layer on the substrate;

forming a wiring conductive layer on the first electrode conductive layer; and patterning the first electrode conductive layer and the wiring conductive layer, and forming the first sensing electrodes and the first connection patterns.

13. The method as claimed in claim 12, wherein forming the first sensing electrodes and the first connection patterns includes patterning the first electrode conductive layer and the wiring conductive layer, and forming first outer wirings in a non-active region around the active region of the substrate and connected to the first sensing electrodes, and second outer wirings in a non-active region around the active region of the substrate and connected to the second sensing electrodes.

14. The method as claimed in claim 12, wherein forming the first sensing electrodes and the first connection patterns further includes removing the wiring conductive layer on the first sensing electrodes and the first connection patterns.

15. The method as claimed in claim 12, wherein forming the second sensing electrodes and the second connection patterns includes:

forming a second electrode conductive layer on the substrate on which the insulating pattern is formed; and patterning the second electrode conductive layer and forming the second sensing electrodes and the second connection patterns.

16. A touch screen panel, comprising:

a substrate divided into an active region and a non-active region around the active region;

first sensing electrodes in the active region and arranged along a first direction, and first connection patterns directly connecting the first sensing electrodes along the first direction;

first outer wirings in the non-active region and connected to the first sensing electrodes;

an insulating pattern capping the first sensing electrodes, the first connection patterns and the first outer wirings; and second sensing electrodes being adjacent to the first sensing electrodes and arranged along a second direction intersecting the first direction, second connection patterns directly connecting the second sensing electrodes in the second direction, wherein:

the first and second sensing electrodes are formed on a same layer, each of the first sensing electrodes includes a first side extending from a corresponding first connection pattern of each of the first sensing electrodes in a third direction different from the first and second directions, each of the second sensing electrode includes a second side extending from a corresponding second connection pattern of each of the second sensing electrodes in the third direction, the insulating pattern includes a third side extending in the third direction, the first side of each of the first sensing electrodes, the second side of each of the second sensing electrodes, and the third side of the insulating pattern are adjacent to each other, the second connection patterns are formed on the insulating pattern, each of the first and second sensing electrodes has a mesh pattern including a plurality of lines crossing each other, and at least one of the plurality of lines of the second side of each of the second sensing electrodes is formed on at least a part of a lateral surface of the third side of the insulating pattern.

17. The method as claimed in claim 1, wherein the at least one of the plurality of lines of the second side of each of the second sensing electrodes overlaps at least one of the plurality of lines of the first side of each of the first sensing electrodes.

* * * * *